(12) United States Patent
Sezerman et al.

(10) Patent No.: US 7,431,513 B2
(45) Date of Patent: Oct. 7, 2008

(54) ADJUSTABLE FOCUS CONNECTOR WITH SPRING ACTION

(75) Inventors: Omur M. Sezerman, Kanata (CA); Garland Best, Almonte (CA); Thoba Nguyen, Ottawa (CA); Steven Keeler, Ottawa (CA)

(73) Assignee: Oz Optics Ltd., Nepean (CA)

( * ) Notice: Subject to any disclaimer, the term of this patent is extended or adjusted under 35 U.S.C. 154(b) by 0 days.

(21) Appl. No.: 11/656,001

(22) Filed: Jan. 22, 2007

(65) Prior Publication Data

US 2007/0206904 A1 Sep. 6, 2007

Related U.S. Application Data

(60) Provisional application No. 60/760,406, filed on Jan. 20, 2006.

(51) Int. Cl.
*G02B 6/36* (2006.01)
(52) U.S. Cl. .............................. 385/53; 385/54; 385/55
(58) Field of Classification Search ............. 385/53–55
See application file for complete search history.

(56) References Cited

U.S. PATENT DOCUMENTS

| 4,753,510 | A | | 6/1988 | Sezerman |
| 4,834,487 | A | * | 5/1989 | Abendschein et al. ......... 385/78 |
| 4,889,406 | A | | 12/1989 | Sezerman |
| 6,250,818 | B1 | | 6/2001 | Loughlin |
| RE38,205 | E | | 7/2003 | Loughlin |

* cited by examiner

*Primary Examiner*—Jennifer Doan
(74) *Attorney, Agent, or Firm*—Jones, Tullar & Cooper, P.C.

(57) ABSTRACT

An adjustable focus connector with spring action is especially adapted for use with common FC or SAM fiber optic receptacles. The connector includes a ferrule holder which mounts a fiber-carrying ferrule at a distal end thereof. At its proximal end the ferrule holder is threadedly connected to a lead screw member. A thrust collar surrounds the ferrule holder and traps a compression spring in the cavity between the thrust collar and the ferrule holder. Because of appropriate interengagement between the components the ferrule holder cannot rotate relative to the trust collar. A traveler is threadedly connected to the lead screw and abuts against the thrust collar. A connection nut is provided at the distal end of the connector to connect it to the fiber optic receptacle. The spring action of the connector prevents damage to the fiber end during connection of the connector to the fiber optic receptacle.

28 Claims, 5 Drawing Sheets

ADJUSTABLE FOCUS CONNECTOR WITH SPRING ACTION

CROSS-REFERENCE TO RELATED APPLICATION

This application claims the benefit of Provisional U.S. Patent Application Ser. No. 60/760,406 filed Jan. 20, 2006.

FIELD OF THE INVENTION

The present invention relates to connectors for connecting optical fibers to receptacles therefore and other related equipment.

BACKGROUND OF THE INVENTION

Existing connectors for optical fibers suffer from several limitations that reduce their effectiveness for precision capture and transfer of light in optical delivery systems, particularly high power laser systems. Fundamental to any such system is the ability to precisely position the fiber at the focus of a laser beam in free space (X, Y and Z planes.).

Figure 1:
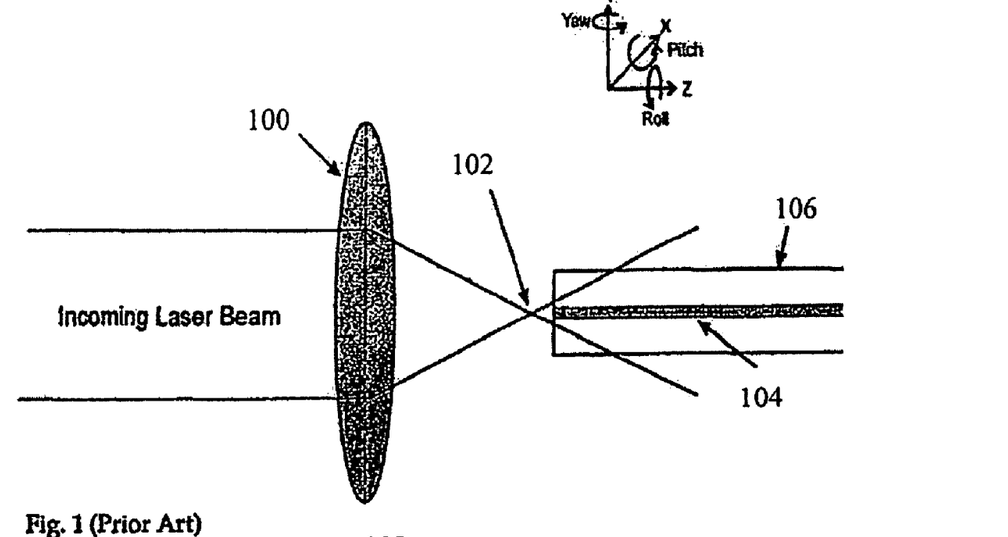
FIG. 1 illustrates a prior art arrangement for focusing light into an optical fiber.

Prior Art FIG. 1 defines the initial application of focusing light into a fiber. A focusing objective lens 100 focuses the light from a laser to a spot 102 closely matching the diameter of the core 104 of fiber 106. This can be as small as 2 to 3 microns in diameter. The fiber then has to be positioned so the end face of the core is at the precise location of the focused spot.

Conventional methods use bulky XYZ translation stages to position the fiber and/or the lens in free space to align the fiber core with respect to the focused spot. Such stages are expensive, and are not applicable to systems where the fiber must be aligned, and semi-permanently attached.

Other methods have been employed where either the fiber is permanently attached to a lens or it is positioned at a fixed distance Z relative to the lens. The fiber/lens assembly is then manipulated and fixed relative to the laser beam in the remaining 5 planes (X, Y, pitch, yaw and roll). U.S. Pat. Nos. 4,753,510 and 4,889,406 of Omur M. Sezerman disclose a tilt-adjustable connector that can be used for such manipulation. The positioning of the fiber in the Z-plane is normally done by terminating the fiber in a conventional fiber connector (see Prior Art FIG. 2). The connector 108 is plugged into a receptacle 110 where it makes contact with a stop 112. The connector ferrule 114 and sleeve 116 are manufactured to a high degree of precision, restricting the fiber in the X-Y plane. The lens 118 is precisely positioned with respect to the receptacle 110 so that the tip of the fiber is positioned at the focal plane of the lens. Assuming that the laser beam entering the lens is perfectly collimated (ie: the laser beam waist location is well within the Rayleigh distance $Z_R$ from the focusing lens), then the focused spot will be at the same distance Z from the lens as the fiber, and only adjustments in the remaining 5 planes are necessary.

Figure 2:
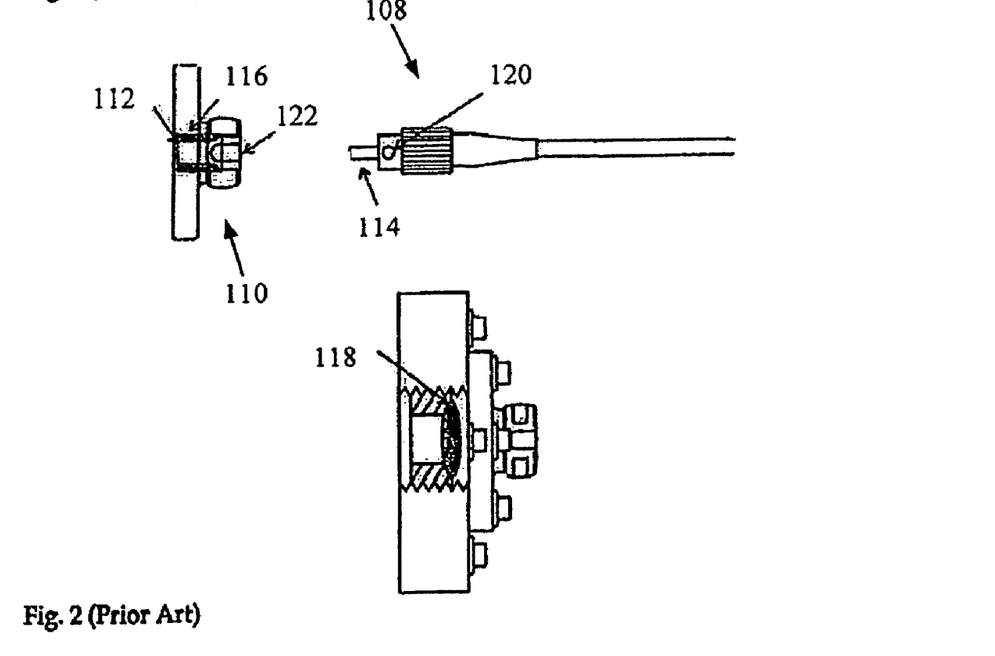
FIG. 2 illustrates another prior art arrangement for connecting an optical fiber to a receptacle.

Note the existence of a key 120 on the connector 108 and keyway 122 on the receptacle 110. This feature allows one to maintain the angular orientation of the fiber (i.e: to control roll). This is necessary for certain applications, such as working with polarization maintaining fibers or with fibers with angled end faces.

The limitation of this technique is that if the laser beam is not well collimated the focused spot will not lie at the focal plane of the lens, and thus it will not lie at the tip of the fiber. Therefore for improved alignment, one needs a way to precisely adjust the distance between the fiber and lens during alignment, preferably without affecting the location of the fiber in the other five axes (X, Y, pitch, yaw, and roll).

One approach to adjust the distance is to move the lens. This suffers from two drawbacks. First the lens is between the fiber and the laser, and is often thus inaccessible. The other is that moving the lens along the Z axis usually causes unwanted motion (play) in the other planes, particularly X and Y.

Another idea is to simply mount the fiber in a threaded tube, and screw the fiber into a mating threaded receptacle. This has the drawback of being unable to control the roll of the fiber, making it unusable for polarization maintaining fiber applications.

Another issue that one wants to avoid is accidentally extending a fiber too close to a lens or other surface, possibly jamming and damaging the tip of the fiber.

An alternative to the previously described connecting systems involves the use of a compression spring within the connection device mounting the optical fiber. U.S. Pat. Nos. RE38,205E (being a reissue of U.S. Pat. No. 5,734,778) and 6,250,818 teach connectors that incorporate at least one compression spring that aids in achieving a degree of adjustment of the fiber relative to the receptacle in which it is to be received. However, in these patents the spring action is not such as to permit any compressive movement after the connector Z-position is located. This leaves open the possibility of jamming and damage to the ferrule tip should it be mated to conventional connectors or receptacles, which rely on some compressive spring action being present when mating.

SUMMARY OF THE INVENTION

The present invention provides an alternative means for adjusting the position of the fiber along the Z-axis, while enjoying the following features:

1) The X-Y precision achieved in conventional connector methods;
2) An optional keyway to control roll;
3) A spring-loaded mechanism to prevent accidental jamming of the fiber;
4) Additional features to allow access to the fiber for surface finishing;
5) Compatibility with existing connector designs.

The present invention is available in two possible configurations: one that is compatible with an existing FCC connector body standard, and another that is compatible with an existing SAM 905 connector body standard. Other designs can be constructed on similar principles.

The connector of the present invention is very useful in achieving efficient coupling with a laser to fiber coupling system such as that discussed above with reference to U.S. Pat. Nos. 4,753,510 and 4,889,406, permitting for precise adjustment of the focus. It is also very useful in fiber-to-fiber coupling systems using two collimators facing each other. As long as at least one side utilizes the connector of the present invention it is possible to achieve precise positioning in X, Y and Z planes as well as with respect to pitch and yaw, optimizing coupling and minimizing losses. The possibility of avoiding contact between fiber ends also permits the coupler to be used in high power situations where contact between fiber ends can lead to damage of the fibers. In straight fiber-to-fiber coupling systems the spring loading achievable with the invention allows the ferrule ends to mate without damage, while the adjustment feature of the invention allows for the deliberate introduction of a gap between the fiber ends, such that the coupler can function as an attenuator.

Generally speaking, the present invention may be considered as providing in one embodiment an adjustable focus connector which comprises: a ferrule holder for retaining at a distal end thereof a ferrule mounting an optical fiber therein; a lead screw member threadedly connected to the ferrule holder at a proximal end of the ferrule holder; a thrust collar surrounding the ferrule holder, the thrust collar and the ferrule holder defining a generally annular cavity therebetween; a traveler member theadedly receiving therein the lead screw member and abutting an adjacent end face of a proximal end wall of the thrust collar; a key frame secured to the thrust collar and extending away therefrom to surround the distal end of the ferrule holder; a compression spring retained within the cavity; and a coupling nut surrounding the key frame and retained thereon for connecting said connector to an FCC receptacle devoid of any stop member therein.

The present invention provides in another embodiment an adjustable focus connector which comprises: a ferrule holder for retaining at a distal end thereof a ferrule mounting an optical fiber therein; a lead screw member threadedly connected to the ferrule holder at a proximal end of the ferrule holder; a thrust collar surrounding the ferrule holder, the thrust collar and the ferrule holder defining a generally annular cavity therebetween; a traveler member theadedly receiving therein the lead screw member and abutting an adjacent end face of a proximal end wall of the thrust collar; a compression spring retained within the cavity; and a coupling nut surrounding the ferrule holder for connecting the connector to an SAM receptacle devoid of any stop member therein.

DESCRIPTION OF THE PREFERRED EMBODIMENTS

FCC Type Fiber Optic Connector

FIGS. 3 to 6 illustrate an adjustable fiber optic connector 10 according to the present invention especially adapted for use with an FCC type of connector or receptacle.

A ferrule holder 12 presents a counterbore in a distal end section thereof (right hand side in FIG. 4) for the mounting of any type of FCC ferrule 14. The ferrule (high power version shown) may be of any type suitable to the end user's purpose.

Figure 5:
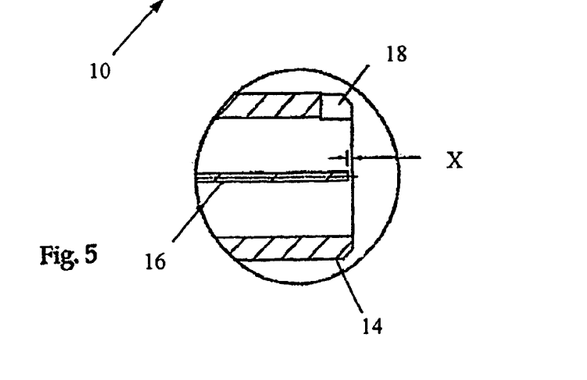
FIG. 5 is an enlarged view of the distal end of the ferrule used in the embodiment of FIG. 3.

The high power ferrule concept is presented here as it is often seen in use with adjustable focus connector. Note that the fiber 16 is suspended in free space with a protective ring around it to prevent accidental damage to the exposed fiber. This design has two features that are advantageous. With reference to FIG. 5 it is first of all seen that the fiber tip is recessed by a distance x, only a few microns, preventing any damage to the fiber should the tip come in contact with a flat surface. The second is the presence of a notch 18 in the ring. This notch permits side inspection of the fiber, and possible access to the fiber for processes like cleaning, or surface treatment of the fiber.

The proximal end of the ferrule holder 12 (left hand side in FIG. 4) presents a threaded section 20 so it may be threaded into and glued permanently to the lead screw 22.

The outside surfaces of the distal section of ferrule holder 12 define a polygonal cross-section, preferably a square section 24 (FIG. 6), which passes through a mating hole in the key frame 26.

Figure 4:
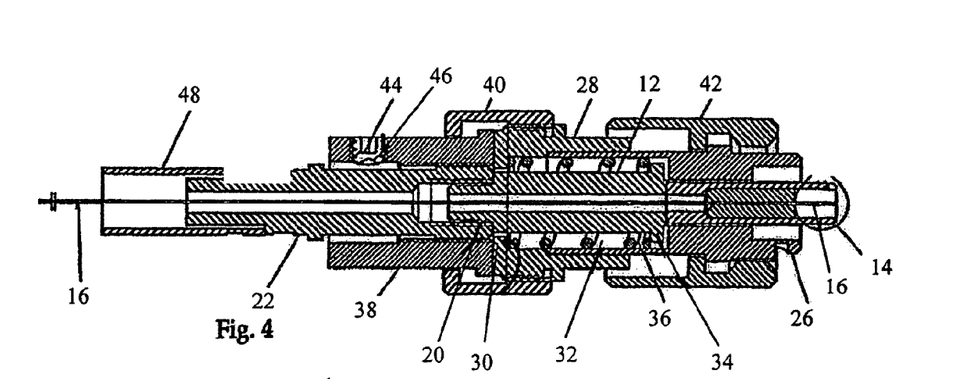
FIG. 4 is a cross-sectional view taken on the line 4-4 of FIG. 3.

A thrust collar 28 surrounds the ferrule holder 12, the thrust collar having a bottom end wall 30 and, with the outer surface of the ferrule holder 12, defining a generally annular cavity 32. A radially outwardly directed flange 34 intermediate the length of the ferrule holder 12 is located adjacent the distal end of the cavity 32.

A compression spring 36 is trapped in the generally annular cavity 32 defined between the bottom end wall 30 of the thrust collar 28. This spring serves to continuously provide force on the ferrule holder/lead screw combination, acting toward the right in FIG. 4.

A traveler member 38, which is basically a nut with an internal thread of fine pitch (80 t.p.i.), is engaged with an external thread on the lead screw 22. It makes contact with the external (left hand side) surface of the thrust collar bottom end wall 30.

A spring guard 40 fits over the traveler 38 and is threaded and permanently affixed onto the thrust collar 28.

The key frame 26 and the thrust collar 28 are glued together, confining the compression spring 34 and ferrule holder 12 inside, and confining an installation or coupling nut 42 outside.

A setscrew 44 is provided for threaded engagement with a threaded bore 46 in the traveler 38 to lock the traveler 38 and lead screw 22 together when required.

A crimp sleeve 48 is for cable jacket attachment, and is not considered part of this device.

Figure 3:
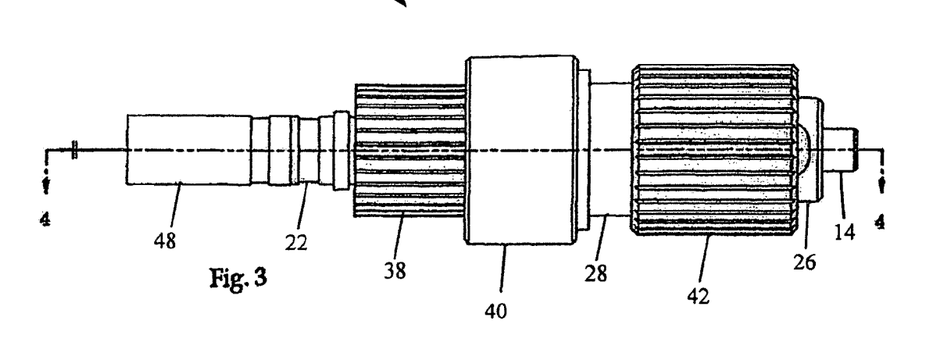
FIG. 3 illustrates a connector according to the present invention for use with an FCC type of fiber optic connector.

Operation:

This male FCC connector 10 is installed in the matching female receptacle by inserting the ferrule 14 into the receptacle "hole", and engaging and tightening the installation nut 42 onto the external thread present on the receptacle. The "hole" in the receptacle, manufactured to suitable tolerances, is a close match to the diameter of the ferrule 14, and is depended upon to prevent lateral movement of the ferrule 14. This action is similar to all available FCC connector/receptacle matchings. A key required difference is that there must not be any stop inside the receptacle. The existence of a stop would prevent forward motion of the ferrule.

With conventional fixed-length ferrule designs, no further actions to facilitate axial (in-out) movement of the ferrule are available to the user. Since the end plane of the fiber is at the outside end of the ferrule, the position of the fiber's end is fixed. The optical coupling obtained between the fiber end and the intended optical mate (lens, other fiber end, etc.) inside the receptacle depends on the manufacturing control of the ferrule length. Also, no ability to influence the accuracy of placement of the optical mate within the receptacle is available to the user of the connector, and this positioning also affects coupling efficiency.

In order to effect user control of coupling efficiency, the connector in question is able to vary the projection of the ferrule as follows:

Before installation of the connector into the receptacle, the user rotates the traveler 38 clockwise, which, by virtue of it's thrust upon the thrust collar 28, will cause the lead screw 22, ferrule holder 12, ferrule 14, and fiber end to move as a unit to the left, compressing the spring 36. The moving items will not rotate, because of the action of the square section of the ferrule holder in the square hole in the key frame 26. The spring 36 will eventually reach the limit of it's compression (go "solid"). This condition represents the minimum ferrule projection (fully retracted).

The connector 10 is installed to the receptacle in the conventional manner as described at the beginning of this section.

The traveler 38 is then rotated counterclockwise by the user, causing the ferrule and other associated parts to move to the right. Thus, by turning the traveler one way or the other, the user can make the ferrule move in and out, i.e. change its projection. By conducting light through the system from receptacle to connector during the adjustment, the user can measure coupling efficiency with an optical power meter, and stop the adjustment when the best coupling is achieved.

Should the user cause a collision to occur between the ferrule end and the optical mate inside the receptacle, the force transmitted by the collision is limited by the compressibility of the spring 36, preventing damage. Also, in the case of a collision, the user will be notified by an abrupt decrease in the turning force required, since the traveler 38 will no longer be contacting the thrust collar 28. In certain cases, causing a collision is actually desirable, since this is the position at which best coupling efficiency is obtained.

The connector can be locked against further adjustment by tightening the setscrew 44 installed in the traveler 38, locking it against the lead screw 22.

When this adjustment procedure has been completed, further adjustment is not possible without loosening the setscrew. Accidental adjustment is not possible.

Although the ferrule projection has been set and locked, a further safety factor exists in the form of residual spring action availability. If the connector were to be carelessly installed into any new situation whereby the existing ferrule projection was too great, and a collision with the optical mate was assured, the spring 36 can still limit the collision force, because of the ability of the traveler 38 to lift clear of the thrust collar 28.

The subject connector thus allows for adjustable ferrule length and hence the ability to maximize optical coupling, and it retains the inherent safety feature of spring "cushioning" regardless of the length to which it has been adjusted.

SAM Style Fibre Optic Connector

Figures 6, 9:
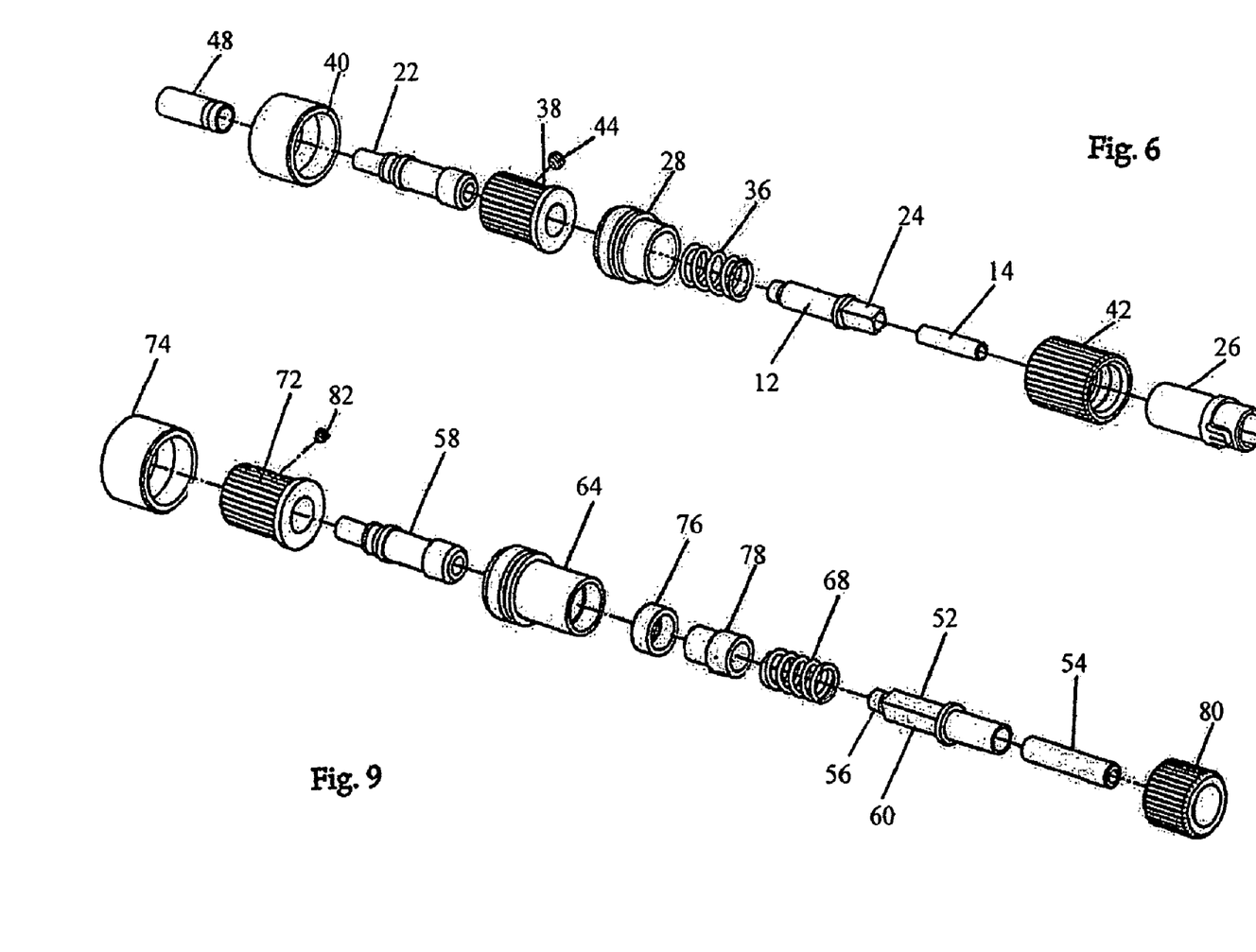
FIG. 6 is a perspective view showing the components of the connector of FIG. 3.
FIG. 9 is a perspective view showing the components of the connector of FIG. 7.
Figure 7:
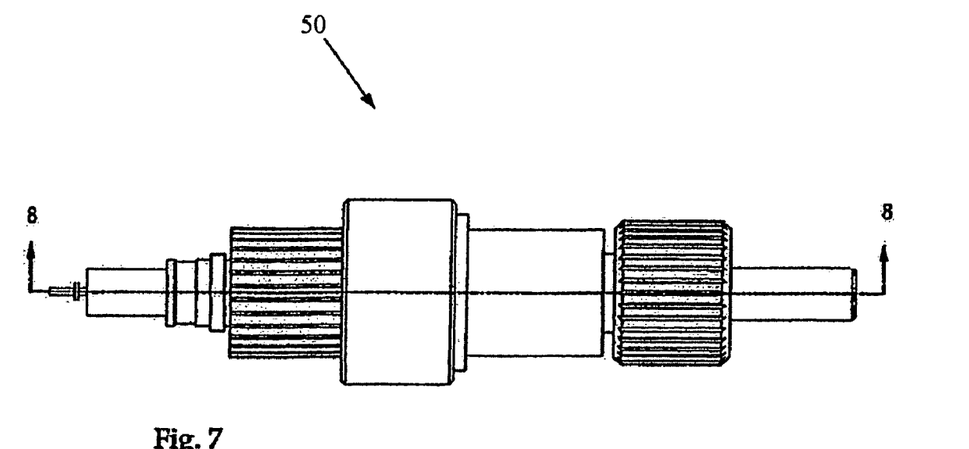
FIG. 7 illustrates a connector according to the present invention for use with an SAM type of fiber optic connector.
Figure 8:
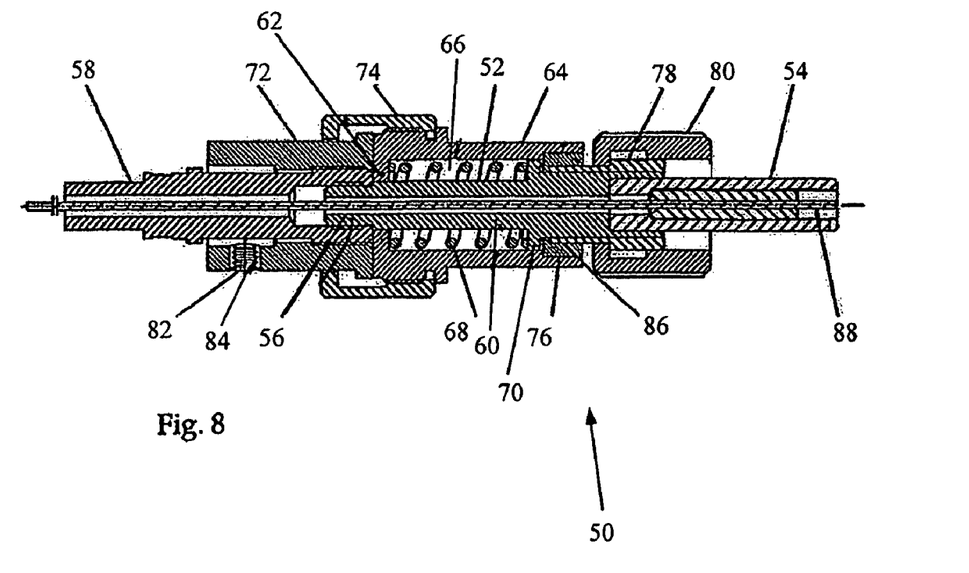
FIG. 8 is a cross-sectional view taken on the line 8-8 of FIG. 7.

Referring now to FIGS. 7 to 9 a connector 50 especially adapted to work with an SAM type of connector is illustrated A ferrule holder 52 presents a counterbore at a distal end thereof (right hand side in FIG. 8) for the mounting of any type of SAM ferrule 54. The ferrule (high power version shown) may be of any type suitable to the end user's purpose.

At the proximal end of the ferrule holder 52 there is a threaded section 56 so that it may be threaded into and glued permanently to a lead screw 58.

A longitudinally extending intermediate section 60 of the ferrule holder 52 presents a polygonal cross-section, preferably a square section, which passes through a mating polygonal hole in a proximal end wall 62 of a thrust collar 64 that generally surrounds the ferrule holder 52. The intermediate section 60 of the ferrule holder 52 and the surrounding thrust collar 64 define therebetween a generally annular cavity 66.

A compression spring 68 is trapped in the cavity 66 between the inner surface or shoulder of the proximal end wall 62 of the thrust collar 64 and a radially outwardly directed flange 70 intermediate the length of the ferrule holder 52 and located generally towards the distal end of the cavity 66. This spring serves to continuously provide force on the ferrule holder/lead screw combination, acting toward the right in FIG. 8.

A traveler 72, which is basically a nut with an internal thread of fine pitch (80 t.p.i.), is engaged with an external thread on the lead screw 58. It makes contact with the external (left hand side) surface proximal end wall 62 of the thrust collar 64.

A spring guard 74 fits over the traveler 70 and is threaded and permanently affixed onto the thrust collar 64.

A nut retainer 76 and stop frame 78 are glued together as at 86 and are glued to the thrust collar 64, and serve to hold captive the coupling or installation nut 80.

A setscrew 82 is provided for threaded engagement with a threaded bore 84 in the traveler 72 to lock the traveler and lead screw together when required.

Operation:

This male SAM connector is installed in the matching female receptacle by inserting the ferrule 54 into the receptacle "hole", and engaging and tightening the installation nut 80 onto the external thread present on the receptacle. The "hole" in the receptacle, machined to suitable tolerances, is a close match to the diameter of the ferrule, and is depended upon to prevent lateral movement of the ferrule. This action is similar to all available SAM connector/receptacle matchings. A key required difference is that there must not be any stop inside the receptacle. The existence of a stop would prevent forward motion of the ferrule.

With conventional fixed-length ferrule designs, no further actions to facilitate axial (in-out) movement of the ferrule are available to the user. Since the end plane of the fiber 88 is at the outside end of the ferrule, the position of the fiber's end is fixed. The optical coupling obtained between the fiber end and the intended optical mate (lens, other fiber end, etc.) inside the receptacle depends on the manufacturing control of the ferrule length. Also, no ability to influence the accuracy of placement of the optical mate within the receptacle is available to the user of the connector, and this positioning also affects coupling efficiency.

In order to effect user control of coupling efficiency, the connector in question is able to vary the projection of the ferrule as follows:

Before installation of the connector into the receptacle, the user rotates the traveler 72 clockwise, which, by virtue of its thrust upon the thrust collar 64, will cause the lead screw 58, ferrule holder 52, ferrule 54, and fiber end to move as a unit to the left, compressing the spring 68. The moving items will not rotate, because of the action of the square section 60 of the ferrule holder 52 in the square hole in the proximal end wall 62 of the thrust collar 64. The spring 68 will eventually reach the limit of its compression (go "solid"). This condition represents the minimum ferrule projection (fully retracted).

The connector is installed to the receptacle in the conventional manner as described at the beginning of this section.

The traveler 72 is then rotated counterclockwise by the user, causing the ferrule and other associated parts to move to the right. Thus, by turning the traveler 72 one way or the other, the user can make the ferrule 54 move in and out, i.e. change its projection. By conducting light through the system from receptacle to connector during the adjustment, the user can measure coupling efficiency with an optical power meter, and stop the adjustment when the best coupling is achieved.

Should the user cause a collision to occur between the ferrule end and the optical mate inside the receptacle, the force transmitted by the collision is limited by the compressibility of the spring 68, preventing damage. Also, in the case of a collision, the user will be notified by an abrupt decrease in the turning force required, since the traveler 72 will no longer be contacting the thrust collar 64. In certain cases, causing a collision is actually desirable, since this is the position at which best coupling efficiency is obtained.

The connector can be locked against further adjustment by tightening the setscrew 84 installed in the traveler 72, locking it against the lead screw 58.

When this adjustment procedure has been completed, further adjustment is not possible without loosening the setscrew. Accidental adjustment is not possible.

Although the ferrule projection has been set and locked, a further safety factor exists in the form of residual spring action availability. If the connector were to be carelessly installed into any new situation whereby the existing ferrule projection was too great, and a collision with the optical mate was assured, the spring 68 can still limit the collision force, because of the ability of the traveler 72 to lift clear of the thrust collar 64.

The subject connector thus allows for adjustable ferrule length and hence the ability to maximize optical coupling, and it retains the inherent safety feature of spring "cushioning" regardless of the length to which it has been adjusted.

Other Applications of the Connector:

Another use of the adjustable connector is for launching light out of a fiber through a lens to focus the light. Again the position of the fiber relative to the lens needs precise adjustment while minimizing unwanted movement in the other planes. Conventional methods of moving the lens to focus the light introduce play, again mainly in the X-Y planes. By using the adjustable focus connector, with its precision sleeve, one is able to move the fiber along the Z-axis only, thus allowing one to change the position and magnification of the focused spot, while tightly constraining its position along a single axis.

Figure 10:
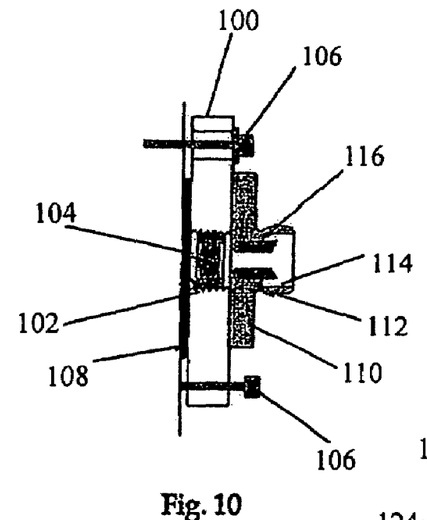
FIG. 10 illustrates a laser-to-fiber coupler system designed for use with an adjustable focus connector of the present invention.

FIG. 10 illustrates a coupler system for effecting laser-to-fiber coupling utilizing an adjustable focus connector of the present invention. The system provides a base member 100 having a central opening or bore 102 in which a lens 104 is mounted. The base member can be adjusted relative to the substrate to which it is secured by way of tilt adjustment screws 106 as described in the aforementioned US patents of Omur M. Sezerman. A resilient sealing member 108 is positioned between the base member and substrate to provide resistance to the adjusting screws and to hermetically seal the assembly. A receptacle 110 is secured to the base member 100 and is provided with a threaded boss 112 projecting from an outer surface thereof. A bore 114 extends through the boss and receptacle 110 and is axially aligned with the bore 102.

The receptacle 110 does not include any stop against which the ferrule of the present connector could abut; however, the receptacle may include a stop face 116 against which the end face of key frame 26 can abut to assure repeatability in the Z direction. When the connector of the present invention has been secured to the receptacle 110 the adjustment operation previously described will control the distance between the fiber end and the lens 104 in the Z direction, while adjustment of the tilt screw 106 will effect any desired adjustment of the fiber in X, Y, pitch and yaw.

Figure 11:
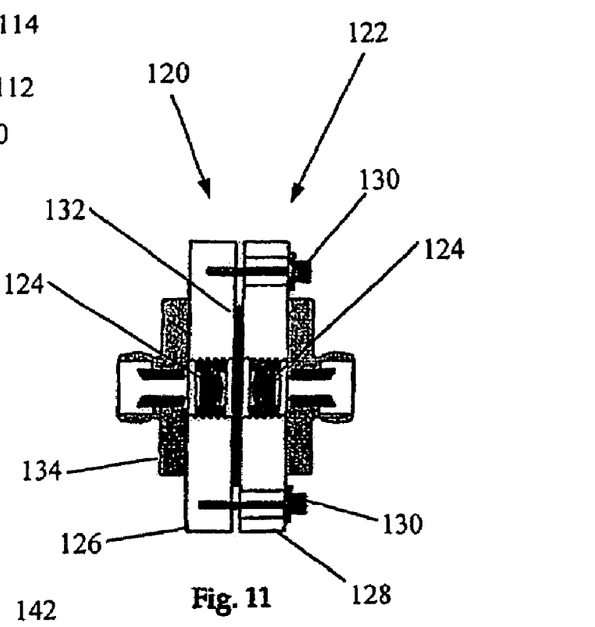
FIG. 11 illustrates a fiber-to-fiber coupler system designed for use with an adjustable focus connector of the present invention.

FIG. 11 illustrates a system similar to that shown in FIG. 10 for a fiber-to-fiber coupling system. The assemblies 120 and 122 are similar to that shown in FIG. 10, with each mounting a lens 124. The base members 126, 128 are adjustable relative to each other by adjusting screws 130, it being noted that there is a resilient sealing member 132 positioned between the base members to provide resistance to the adjusting screws and to hermetically seal the assembly. At least one of the optical fibers secured to the coupling system is adjustably mounted to one of the receptacles 134 of the base members as described above with respect to FIG. 10. Light from one of the fibers is collimated by its lens 124 and then focused into the other fiber by the other lens 124. The position of the focus spot is adjusted in the XY plane by the tilt adjustment mechanism of the assembly, using the screws 130. The position of the focus spot in the Z direction relative to the fiber pair is achieved through adjustment of the adjustable connector as described hereinabove.

Figure 12:
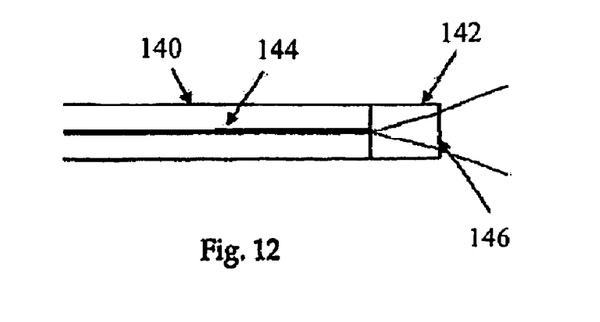
FIG. 12 illustrates a fiber having an end cap thereon with which an adjustable focus connector of the present invention is particularly useful.

FIG. 12 shows an optical fiber 140 having a piece of silica 142 fused to the end thereof, forming a window or endcap. This allows for high power handling. Light from the fiber core 144 can then expand so that when such light reaches the fused silica/air interface 146 the energy density ($W/m^2$) is greatly reduced, minimizing the risk of damage to the fiber. However, the use of an endcap prevents utilization of a conventional stop in couplers such as those of the Sezerman patents, as the location of the minimum waist no longer coincides with the end of the device. This problem is rectified when a fiber with endcap is mounted in an adjustable focus connector of the present invention since the adjustability compensates for the different light pattern resulting from the use of an endcap.

The invention claimed is:

1. An adjustable focus connector comprising:
    a ferrule holder for retaining at a distal end thereof a ferrule mounting an optical fiber therein;
    a lead screw member threadedly connected to said ferrule holder at a proximal end of said ferrule holder;
    a thrust collar surrounding said ferrule holder, said thrust collar and said ferrule holder defining a generally annular cavity therebetween;
    a traveler member threadedly receiving therein said lead screw member and abutting an adjacent end face of a proximal end wall of said thrust collar;
    a key frame secured to said thrust collar and extending away therefrom to surround the distal end of said ferrule holder;
    a compression spring retained within said cavity;
    a coupling nut surrounding said key frame and retained thereon for connecting said connector to an FC receptacle devoid of any stop member therein; and
    a spring guard surrounding portions of said traveler member and said thrust collar where said traveler member abuts said thrust collar, said spring guard being threadedly secured to said thrust collar;
    wherein said ferrule holder includes a radially outwardly directed flange intermediate the length thereof against which a distal end of said compression spring abuts.

2. The adjustable focus connector according to claim 1 wherein said distal end of said ferrule holder has a polygonal cross-section, said key frame having a matching polygonal central bore for receiving said distal end of said ferrule holder.

3. An adjustable focus connector comprising:
   a ferrule holder for retaining at a distal end thereof a ferrule mounting an optical fiber therein;
   a lead screw member threadedly connected to said ferrule holder at a proximal end of said ferrule holder;
   a thrust collar surrounding said ferrule holder, said thrust collar and said ferrule holder defining a generally annular cavity therebetween;
   a traveler member threadedly receiving therein said lead screw member and abutting an adjacent end face of a proximal end wall of said thrust collar;
   a key frame secured to said thrust collar and extending away therefrom to surround the distal end of said ferrule holder;
   a compression spring retained within said cavity;
   a coupling nut surrounding said key frame and retained thereon for connecting said connector to an FC receptacle devoid of any stop member therein; and
   a set screw receivable in a radially directed threaded bore extending through said traveler member and engageable with said lead screw member to lock said traveler member longitudinally with respect to said lead screw member.

4. The adjustable focus connector according to claim 1 including a radially outwardly directed flange on said key frame for retaining said coupling nut to said connector.

5. The adjustable focus connector according to claim 1 wherein a proximal end of said compression spring abuts an interior surface of said proximal end wall of said thrust collar.

6. The adjustable focus connector according to claim 1 wherein a tip of said optical fiber is recessed inwardly of the distal end of said ferrule holder, said distal end having a notch therein providing visual and tactile access to said fiber tip.

7. The adjustable focus connector according to claim 1 wherein a fused silica endcap is fused to the distal end of said optical fiber.

8. An adjustable focus connector comprising:
   a ferrule holder for retaining at a distal end thereof a ferrule mounting an optical fiber therein;
   a lead screw member threadedly connected to said ferrule holder at a proximal end of said ferrule holder;
   a thrust collar surrounding said ferrule holder, said thrust collar and said ferrule holder defining a generally annular cavity therebetween;
   a traveler member threadedly receiving therein said lead screw member and abutting an adjacent end face of a proximal end wall of said thrust collar;
   a compression spring retained within said cavity;
   a coupling nut surrounding said ferrule holder for connecting said connector to an SMA receptacle devoid of any stop member therein; and
   a spring guard surrounding portions of said traveler member and said thrust collar where said traveler member abuts said thrust collar, said spring guard being threadedly secured to said thrust collar;
   wherein said ferrule holder includes a radially outwardly directed flange intermediate the length thereof against which a distal end of said compression spring abuts.

9. The adjustable focus connector according to claim 8 wherein said ferrule holder includes a longitudinally extending intermediate section between said flange and said proximal end of said ferrule holder, said intermediate section having a polygonal cross-section, said thrust collar having a mating polygonal central opening through said proximal end wall thereof for receiving said intermediate section of said ferrule holder, the proximal end of said compression spring abutting against an interior surface of said proximal wall.

10. An adjustable focus connector comprising:
    a ferrule holder for retaining at a distal end thereof a ferrule mounting an optical fiber therein;
    a lead screw member threadedly connected to said ferrule holder at a proximal end of said ferrule holder;
    a thrust collar surrounding said ferrule holder, said thrust collar and said ferrule holder defining a generally annular cavity therebetween;
    a traveler member threadedly receiving therein said lead screw member and abutting an adjacent end face of a proximal end wall of said thrust collar;
    a compression spring retained within said cavity;
    a coupling nut surrounding said ferrule holder for connecting said connector to an SMA receptacle devoid of any stop member therein; and
    a set screw receivable in a radially directed threaded bore extending through said traveler member and engageable with said lead screw member to lock said traveler member longitudinally with respect to said lead screw member.

11. The adjustable focus connector according to claim 8 including a nut retainer and stop frame adhered to said distal end of said ferrule holder for retaining said coupling nut to said connector.

12. The adjustable focus connector according to claim 8 wherein a fused silica endcap is fused to the distal end of said optical fiber.

13. A system for connecting an optical fiber to a source of light comprising:
    a base member having a central bore therethrough mounting a lens within said bore;
    means for tiltably adjusting said base member relative to a substrate;
    a receptacle member mounted to said base member and having an externally threaded annular boss thereon with a bore aligned with said central bore; and
    an adjustable focus connector for adjustable attachment to said receptacle member, said connector comprising:
       a ferrule holder for retaining at a distal end thereof a ferrule mounting said optical fiber therein;
       a lead screw member threadedly connected to said ferrule holder at a proximal end of said ferrule holder;
       a thrust collar surrounding said ferrule holder, said thrust collar and said ferrule holder defining a generally annular cavity therebetween;
       a traveler member threadedly receiving therein said lead screw member and abutting an adjacent end face of a proximal end wall of said thrust collar;
       a compression spring retained within said cavity;
       means preventing relative rotation between said ferrule holder and said thrust collar; and
       a threaded coupling nut surrounding said ferrule holder and retained thereon for connecting said connector to said threaded boss of said receptacle member.

14. The system of claim 13 wherein said fiber has a fused silica endcap fused to the distal end thereof.

15. A method of coupling light from a source to an optical fiber using the system of claim 13 comprising the steps of:
    rotating said traveler member on said lead screw member in order to compress said spring within said cavity through movement of said lead screw member, said ferrule holder and said ferrule in a first direction;

coupling said connector to said receptacle member by inserting said ferrule into said boss bore and rotating said coupling nut to threadedly secure said connector to said receptacle member;

rotating said traveler member on said lead screw member in order to reduce the compression on said spring through movement of said lead screw member, said ferrule holder and said ferrule in a second direction opposite to said first direction;

passing light through said optical fiber and monitoring coupling efficiency using a power meter during said last-mentioned rotating step; and ceasing said last-mentioned rotating step on achieving optimum coupling efficiency as determined by said power meter.

16. The method of claim 15 further including the step of tiltably adjusting said base member relative to said substrate using said tilt adjustment means to further improve coupling efficiency.

17. The method of claim 15 including the step of locking said traveler member to said lead screw member in order to prevent unwanted relative movement between said members following adjustment of said connector.

18. A system for connecting a first optical fiber to a second optical fiber comprising:

first and second base members, each base member having a central bore therethrough mounting a lens therein;

each of said base members mounting thereon a receptacle member having an externally threaded annular boss thereon with a bore aligned with said central bore;

means connecting said first and second base members together with said central bores and boss bores being axially aligned with each other, said connecting means including means for tiltably adjusting said first and second base members with respect to each other; and means for connecting a first optical fiber to said first receptacle member and a second optical fiber to said second receptacle member, at least one of said optical fiber connecting means comprising:

an adjustable focus connector for adjustable attachment to one of said receptacle members, said connector comprising:

a ferrule holder for retaining at a distal end thereof a ferrule mounting said optical fiber therein;

a lead screw member threadedly connected to said ferrule holder at a proximal end of said ferrule holder;

a thrust collar surrounding said ferrule holder, said thrust collar and said ferrule holder defining a generally annular cavity therebetween;

a traveler member threadedly receiving therein said lead screw member and abutting an adjacent end face of a proximal end wall of said thrust collar;

a compression spring retained within said cavity;

means preventing relative rotation between said ferrule holder and said thrust collar; and a threaded coupling nut surrounding said ferrule holder and retained thereon for connecting said connector to said threaded boss of said one receptacle member.

19. The system of claim 18 including a second adjustable focus connector for adjustable attachment to the other of said receptacle members.

20. The system of claim 18 wherein said fiber has a fused silica endcap fused to the distal end thereof.

21. A method of coupling light from a first optical fiber to a second optical fiber using the system of claim 18 comprising the steps of:

rotating said traveler member on said lead screw member in order to compress said spring within said cavity through movement of said lead screw member, said ferrule holder and said ferrule in a first direction;

coupling said at least one connector to a corresponding one of said receptacle members by inserting said ferrule into the boss bore thereof and rotating said coupling nut to threadedly secure said connector to said corresponding receptacle member;

rotating said traveler member on said lead screw member in order to reduce the compression on said spring through movement of said lead screw member, said ferrule holder and said ferrule in a second direction opposite to said first direction;

passing light through one of said optical fibers and monitoring coupling efficiency using a power meter during said last-mentioned rotating step; and ceasing said last-mentioned rotating step on achieving optimum coupling efficiency as determined by said power meter.

22. The method of coupling light according to claim 21 including the step of tiltably adjusting one of said base members relative to the other of said base members using said tilt adjustment means to further improve coupling efficiency.

23. The adjustable focus connector according to claim 3 including a radially outwardly directed flange on said key frame for retaining said coupling nut to said connector.

24. The adjustable focus connector according to claim 3 wherein a proximal end of said compression spring abuts an interior surface of said proximal end wall of said thrust collar.

25. The adjustable focus connector according to claim 3 wherein a tip of said optical fiber is recessed inwardly of the distal end of said ferrule holder, said distal end having a notch therein providing visual and tactile access to said fiber tip.

26. The adjustable focus connector according to claim 3 wherein a fused silica endcap is fused to the distal end of said optical fiber.

27. The adjustable focus connector according to claim 10 including a nut retainer and stop frame adhered to said distal end of said ferrule holder for retaining said coupling nut to said connector.

28. The adjustable focus connector according to claim 10 wherein a fused silica endcap is fused to the distal end of said optical fiber.

* * * * *